April 21, 1964  P. J. G. RICHAUD  3,129,932
MEANS FOR CONTINUOUSLY TREATING DIVIDED MATERIALS
Filed Dec. 22, 1961  2 Sheets-Sheet 1
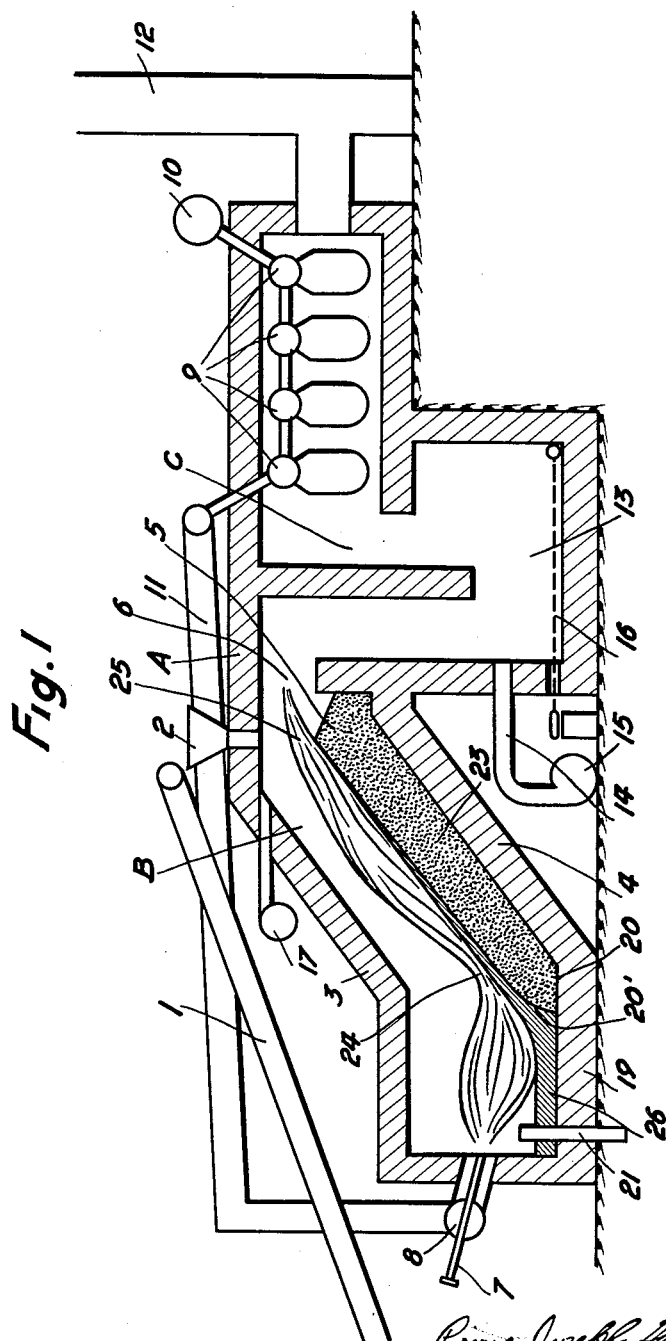

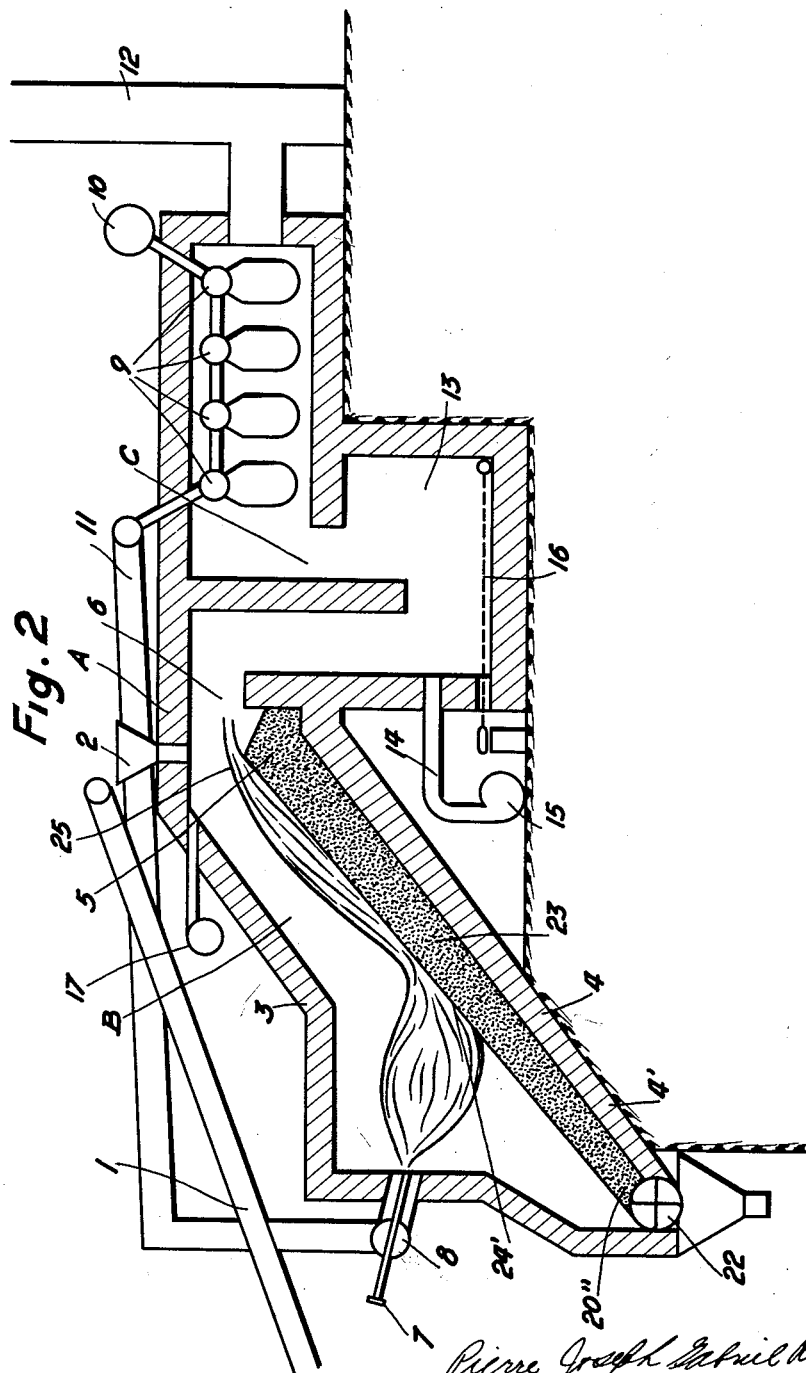

United States Patent Office 3,129,932
Patented Apr. 21, 1964

3,129,932
MEANS FOR CONTINUOUSLY TREATING
DIVIDED MATERIALS
Pierre Joseph Gabriel Richaud, Martigues, France, assignor to Ciments Lafarge, Paris, France, a corporation of France
Filed Dec. 22, 1961, Ser. No. 161,550
Claims priority, application France May 5, 1961
2 Claims. (Cl. 263—27)

This invention relates to means for the continuous treatment of minerals, ores, and similar finely divided materials by heat, and more especially for the sintering and/or fusing of such materials.

In the conversion and/or reaction treatment of a wide variety of raw materials, it is required, if the process is to be performed continuously, that the materials be fed to the conversion or treating apparatus in the form of comparatively large pieces or lumps. One of the reasons for this requirement is that if the treated stock is too fine, a considerable proportion of it is carried away as dust e.g. with the combustion product gases; another reason is that a fine granulometry will not permit a satisfactory circulation of combustion gases through the mass of treated material.

Considering for example the field of cement and slag manufacturing processes, which is one important field of use of the present invention, the operations are sometimes carried out batchwise in reverberatory or equivalent furnaces, but the present trend is to work continuously in revolving kilns, vertical tube furnaces, or other reactors which may combine features of both these types of apparatus.

In all such continuous reactor apparatus, the raw stock is charged at one end and the product is withdrawn from the other end. As the charged material travels along the reactor (by gravity or under some other motive force), it undergoes conversion and/or reaction due to the heat applied in the reactor apparatus. Considering for example an oven of the type using an inclined revolving tube chamber, the stock is fed from the upper end and advanced down the tube by the joint action of rotation and gravity, and the final product is discharged from the lower end. The necessary heat is supplied by the combustion of a suitable fuel above the charge. The rotation of the tube causes a milling of the materials undergoing reaction and/or conversion and thus increases the heat exchange processes. At the same time however the milling action increases the entrainment of the finer particles of material with the flue gases as indicated above, and not infrequently the losses thus incurred attain as much as 20% of the converted product.

Similarly, in the case of a vertical tube furnace into which the stock is fed through the upper end, the materials move down by gravity and the product is discharged at the bottom. The necessary heat is supplied by combustion of a fuel within the body of the charge in the interstices between the lumps of material. If such combustion is to be successfully maintained, it is clear that the lumps composing the charge should be larger than a certain size.

In the above and similar continuous processes, it is essential therefore that the raw stock used must possess a certain minimum granulometric size; fines, particles having a maximum dimension less than about 1 inch, and the like cannot be used. In all such processes it is necessary to subject the raw materials, at some stage prior to the actual reaction process, to a grading step in which the finer granulometric fractions are rejected. In many cases the proportion of rejects due to insufficient size attains 60–70% of the total amount of stock from the crushing plant. True, the fine fractions thus rejected may sometimes be used ultimately if subjected to a re-agglomerating step, but this of course gravely affects the over-all economy of the processes considered. In many cases moreover, the presence of a binder, as required in the conglomerating step, cannot be tolerated in the final product, and the rejects cannot be reused at all but constitute a total loss.

It is hence an object of this invention to provide apparatus whereby the finer granulometric fractions heretofore considered unusable or not directly usable in many types of continuous processes, can be effectively made use of along with the coarser fractions, and thereby to enhance in very high proportions the economy of many types of continuous reaction and conversion heat processes.

The underlying principles of the invention were discovered by me incident to a consideration of the natural phenomena involved in the motions of glaciers down a mountainside.

A glacier can be regarded as a mass comprised of a great many blocks of ice more or less fused into a solid mass. Melting occurs primarily at the surface of the mass and at an increasing rate from the top of the glacier to the foot of it, as the average atmospheric temperature gradually increases with decreasing altitude. The glacier rests with its bottom upon the thalweg of its bed and the foot of the glacier is supported stably on the valley only so long as the atmospheric temperature of the air overlying the ice is so low that substantially no melting can occur at any point. Normally however, substantial melting occurs over a considerable period of the year; such melting begins at the foot of the glacier and progresses further and further up as the atmospheric temperature becomes warmer. So soon as melting commences, the galcier is no longer stably supported at its lower or valley end, but begins to slip under its own weight along the thalweg at a rate depending on the natural slopes encountered. The water produced by the surface melting streams down along the surface and into the cracks or crevasses and the heat introduced by it increases the melting rate at the foot and within the body of the glacier which slips or creeps at an increasing rate.

Under natural conditions owing to the seansonal cycle, glaciers undergo a cyclic evolution. Assuming however it were possible to keep the valley continually warm and the top of the glacier continually cool and constantly fed with snow to sustain the formation of ice, the condition of the glacier would assume a permanent, steady-state character and the glacier would become a continuously melting and steadily moving object.

According to the invention, I have discovered that it is possible to apply such steady-state conditions to a mass of finely divided raw materials to cause them to undergo a continuous heat converting process, e.g. melting or sintering, very similar to the conditions that would prevail in a glacier under the above steady-state assumptions.

According to the invention, for this purpose, I provide a heap or bed of the divided materials upon a plane area within an enclosure, so as to provide a natural slope; I provide at a point of this slope a zone of high temperature sufficient to cause a surface melting of the materials on the slope; the materials streaming down the slope as a result of the melting are discharged from the foot of the slope; and fresh finely divided materials are continuously fed to the top of the slope at a corresponding rate.

The requisite heat for the reaction may be supplied by the combustion of an appropriate fuel, or by electrical or other heating means. The combustion products if any are discharged from the top of the heap and may be reused for external heating and/or for preheating purposes.

The bed of materials may be supported upon a horizontal plane or an inclined plane, and may form a conical heap having the natural slope angle of the material concerned.

The final products of the treatment may be discharged in any convenient manner, in the liquid state if a melting treatment is concerned, or by mechanical means if sintered products are obtained.

Replenishment of the bed at the top to maintain a constant level may be performed continuously or at intervals.

The operating parameters, including the elevation of the bed, the angle of the incline and the temperature maintained at the foot of the bed should in each instance be selected with regard to the character of the materials being treated and the final product desired. Such parameters can readily be predetermined by relatively simple tests.

The invention further comprises a furnace or reactor apparatus operated by the above method for the melting or sintering of finely divided materials, such as natural and processed ores, ground products and other materials. The improved furnaces are especially applicable for the production of cements from lime and silica; limestone and bauxite; limestone and clay or marl, and other combinations of mineral ores. They are also usable for the production of alumina lime base slags and the like.

A furnace according to the invention essentially comprises an enclosure, inlet means for feeding raw materials to the top of the enclosure, said enclosure including a wall surface for receiving the materials in a bed or heap thereon, so as to form a free sloping surface, means for directly heating a surface zone of said material, and means for discharging converted products from the bottom of the enclosure, and means for discharging combustion gases, if any, from the top of the enclosure adjacent the top of the heap or bed.

Preferably the wall receiving the bed of material thereon is inclined to the horizontal plane. However, the material may alternatively be heaped on a horizontal surface, or on a surface comprising symmetrical surface portions to opposite sides of a vertical axis, and with the materials then being fed by way of an overhead central inlet to form a substantially conical heap having a cone angle corresponding to the natural slope angle of the materials.

The heating means are preferably arranged so as to apply heat directly to the foot or base of the slope, if the process involved is a melting process and the molten material is discharged through a melt outlet or runner of any suitable type.

Where on the other hand the product is to be recovered in sintered form, the heating means are preferably arranged to apply heat to an area of the slope at some elevation above the foot of it, such elevation being predetermined with regard to the degree of sintering desired and the particular material used. In such case mechanical discharge means for the sintered product are provided, such as a screw extractor or the like, working in the base of the bed.

In cases where the materials are deposited in the form of a conical heap as mentioned above, a plurality of heating means and/or discharge means are preferably provided, uniformly spaced around the circumference of the conical heap.

Two exemplary embodiments of furnaces constructed according to the invention will now be described with reference to the accompanying drawings, wherein:

FIG. 1 is a simplified longitudinal sectional view of a melting furnace, and

FIG. 2 is a similar view of a sintering furnace.

In each of the embodiments described, the furnace of the invention comprises an enclosure A which defines a treating chamber B in which the materials are received and treated and from which the products are discharged, and a heat recovery rear chamber C. An input conveyor line 1 is shown as discharging into a feeder funnel or hopper 2 disposed in the roof of the enclosure A above the treating chamber B. The treating chamber B is defined by an upper inclined wall 3 at the front and a bottom inclined wall 4 at the rear. The raw materials from conveyor 1 drop through the feeder 2 and on to the upper part of the bottom wall 4 to provide a bed 5 thereon. The chambers B and C communicate at their top by an aperture 6 formed in a separating partition between the chambers. A heater 8 is mounted in an opening formed in the front wall of the enclosure A and is fed with a suitable fuel through a fuel line 7, and with a combustion air through a line 11.

Positioned in the front chamber C is a battery of air heaters 9 to which air is delivered by a fan 10, and the preheated combustion air is passed through the line 11 to the heater air inlet. The combustion products are discharged from chamber C to a stack 12. The preheating chamber C is formed with portion 13 into which secondary combustion air is delivered through a pipe 14 connected with the outlet of a fan 15, this serving to control the temperature of the flue gases according to requirements, and depending on the terminal characteristics of the heat exchange materials provided in the heater battery 9. A withdrawable tray 16 provided at the base of the intermediate chamber portion 13 permits removal of combustion product particles settling in the chamber without having to shut down the furnace. An auxiliary fan 17 serves to deliver combustion air into the top of the enclosure A for additional control of the heat treatment occurring in the treatment chamber B.

The arrangements so far described are common to both the embodiments illustrated in FIGS. 1 and 2. The differences between the two embodiments and the detailed operation thereof will now be described.

In the melting furnace shown in FIG. 1, the treating chamber B is defined at its bottom, in front of the inclined wall 4, by a horizontal base or hearth section 19 which serves to sustain the foot 20 of the heap of materials undergoing treatment. Formed in a front portion of the base 19 is a discharge hole or runner 21 for the molten product. Numeral 20' designates the end of the bed 23.

Turning to the sintering furnace of FIG. 2, it is seen that the inclined bottom wall 4 is extended at 4' to a substantial depth below the floor level of the chamber C (or at any rate a substantial depth below the level of heater 7). The extended inclined wall 4' cooperates with the front wall of the enclosure to define a discharge hopper in the base of which is mounted an extractor conveyor 22 which is covered over by and operates directly within the base portion 20' of the heap of materials.

Returning to the melting furnace of FIG. 1, its operation is as follows. Initially the mixture of finely divided raw materials to be melted is fed by way of conveyor 1 and feeder 2 and the materials are distributed evenly over the inclined plane 4 until there is formed thereon a substantial bed as shown at 23. The burner 8 is then fired. Numeral 24 designates that portion of the flame that is immediately above the molten surface of the bed 23 in the vicinity of the foot. A high-temperature flame 4 is discharged on to the foot 20 of the heap 23, as shown, and sweeps upwardly over the surface of the bed, so that the tip of the flame 25 preheats the material at the top of the bed. The material at the surface of the bed begins to melt, and the molten material streams down the surface of the slope and into the cracks which inevitably form in the bed owing to the non uniform flow conditions, just as crevasses form in a mountain glacier. The streaming of hot molten material acts to heat the subjacent layers of material and contributes to the rapid formation of a mass of molten material at the foot of the slope in the high temperature zone created by the heater 8. Following up further the analogy with glaciological processes, it can be said that the underlying layers farthest removed from the surface do not melt at any time and provide a continuous support for the mass upon the foot or base surface at 20, unless the feeding of the mass with fresh material from the top is interrupted, in which case the mass would be subjected to cyclically variable temperature conditions similar to what actually does occur in a glacier owing to seasonal temperature variations.

Thus it is seen that a molten pool 26 of substantial depth builds up on the flat hearth portion 19 and serves as a homogenizing bath for the material which flows to the runner outlet 21 whence it may be collected in any suitable receiver. Th molten material streaming down the slope from the top of the bed is continually (or at sufficiently frequent intervals) replenished from the conveyor 1 through the feeder funnel 2. The fan 17 may be operated when necessary to avoid premature melting in the upper feeding zone. The combustion products are discharged from treating chamber B through the aperture 6 into the exchange chamber C in which their temperature is lowered and held at a prescribed moderate value by mixing with fresh air delivered by fan 15, and heat exchange with the combustion air in the reheater apparatus 9. The dust particles entrained with said combustion gases are largely deposited in the intermediate chamber section 13 and settle on the tray 16 whereby they can be extracted at intervals without shutting down the furnace. Finally, the substantially dust-free and cooled combustion gases issue out through the stack 12.

Molten slag obtained by the process just described in the furnace of FIG. 1 may be ground or used on any other appropriate form. In cases where the raw material delivered through the conveyor 1 comprises fine and small granulometric fractions of ordinary bauxite and limestone, in a granulometry range of from 0 to 25 mm., satisfactory results have been had when heating the surface of the heap to a temperature of the order of 1600° C. The product slag was perfectly homogeneous and constituted an excellent molten cement of a high commercial grade.

Considering now the sintering furnace of FIG. 2, the starting-up operations are substantially the same as in the case of the melting furnace described. However, it will be observed in this case that the material is first heated by the flame in the zone 24' substantially midway up the slope. The molten material produced in this zone runs down the nether slope portion 4' and there cools in contact with the unheated materials, thus providing a sintered product. The mechanical extractor 22 (e.g. a screw) operates in the materials at the foot 20 of the bed and continually excavates it to cause a continuous downsliding of the materials down the slope. The sintered product discharged by the extractor may be collected in any suitable receiver and exposed to additional treatment if desired.

It will thus be seen that the invention provides highly advantageous novel apparatus for the continuous heat treatment of divided materials, applicable for a diversity of purposes. In addition to the advantages earlier mentioned relating to the possibility of utilizing granulometric grades of materials, such as slimes, not heretofore amenable to use otherwise than by expensive and often objectionable conglomerating pre-treatments, it will be noted that the furnace or reactor apparatus embodying the invention are extremely simple, do not include any mechanical moving components in the high-temperature treating zones, whereby such furnaces are simple and inexpensive to build and maintain and have a long trouble-free life.

It will be evident that the invention may be embodied in many types of apparatus other than the two specifically shown, and may be applied to various treatments and processes other than those expressly mentioned.

What I claim is:

1. Apparatus for continuously heating divided materials including fines and coarser fractions comprising means for supporting a bed of said material, said bed having a freely sloping surface, means for applying heat to said surface of the bed in a region beginning substantially below the top of the bed and extending to the top of the bed to melt the material in said region and to cause it to flow down said sloping surface and prevent loss of fines and other materials from escaping through the gases of combustion, means for withdrawing treated materials from the foot of said sloping surface, means for supplying said material to the top of the bed at a rate corresponding substantially to the rate of withdrawal of said material, an enclosure about said supporting means, heating means and removing means, means defining an opening in a top wall of said enclosure to admit the material supplied by said supplying means, means defining a passage in an end wall of said enclosure for discharging the exhaust gases from said enclosure, an intermediate chamber adjacent said enclosure and communicating therewith through said means defining a passage, means in said intermediate chamber for withdrawing therefrom fine particles of material carried into said intermediate chamber by the exhaust gases, a heat exchange chamber, means for admitting the exhaust gases to said heat exchange chamber from said enclosure, and heat exchange means in said chamber heated by the exhaust gases.

2. The apparatus as claimed in claim 1 further comprising means for introducing additional combustion supporting gas into said intermediate chamber.

References Cited in the file of this patent

UNITED STATES PATENTS

| | | |
|---|---|---|
| 154,970 | Wessels | Sept. 15, 1874 |
| 414,051 | Hutchinson | Oct. 29, 1889 |
| 613,828 | Storer et al. | Nov. 8, 1898 |
| 1,032,745 | Dow | July 16, 1912 |
| 1,322,516 | Barnes | Nov. 25, 1919 |
| 1,676,267 | Kunzel | July 10, 1928 |
| 1,682,343 | Lanigan | Aug. 28, 1928 |
| 1,700,515 | Prince | Jan. 29, 1929 |
| 1,789,531 | McCourt | Jan. 20, 1931 |
| 1,807,307 | Dawans | May 26, 1931 |
| 1,869,591 | Wagstaff | Aug. 2, 1932 |
| 1,880,012 | Brassert | Sept. 27, 1932 |
| 1,992,084 | McGregor | Feb. 19, 1935 |
| 2,463,595 | Burns | Mar. 8, 1949 |

FOREIGN PATENTS

| | | |
|---|---|---|
| 509,067 | France | Oct. 3, 1920 |
| 986,026 | France | July 26, 1951 |